United States Patent Office 3,301,574
Patented Jan. 31, 1967

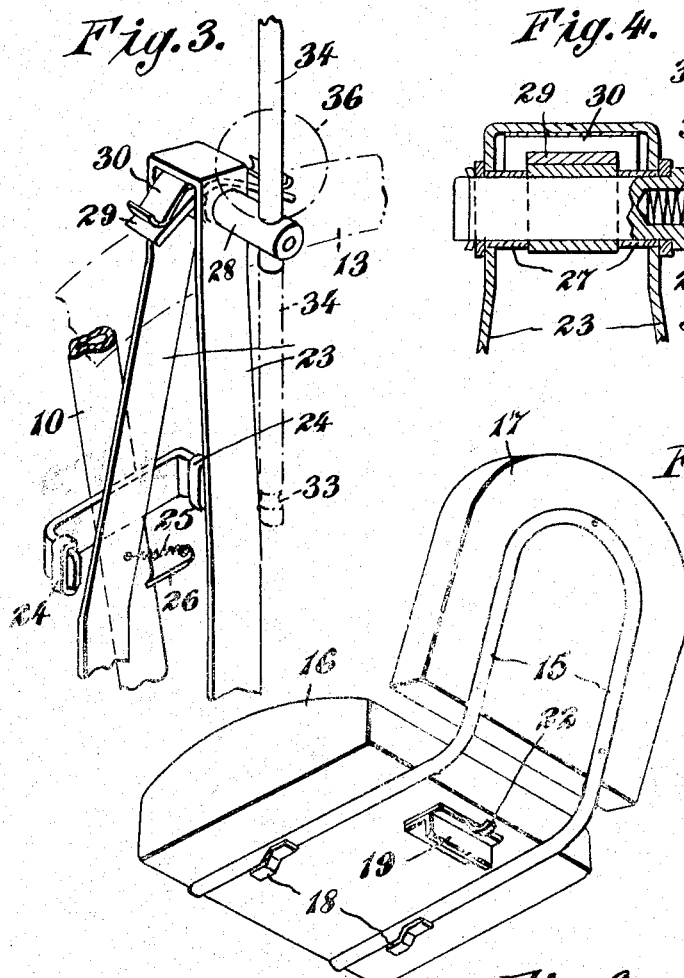

3,301,574
PROPELLING ARRANGEMENT FOR WHEELED CHAIRS
Brian Taylor Good, North Lodge, Kirkby Mallory, England
Filed Oct. 7, 1964, Ser. No. 402,293
3 Claims. (Cl. 280—211)

This invention relates to wheeled chairs adapted for use by invalids and has for its objects to provide an improved chair particularly adapted for use in a conventional dwelling, that is capable of being manoeuvred into the relatively narrow space afforded in a house or bungalow which has not been especially designed to accommodate invalids; and to provide a chair of this nature which may be propelled by the occupant and which may be mounted or dismounted by the occupant in a simple manner, thereby minimizing the extent of reliance of an invalid upon assistance from others in performing movements in the dwelling including normal household tasks.

In accordance with the invention considered broadly an invalid chair comprises a seat and a backrest, a pair of main wheels and at least one auxiliary wheel, all of the wheels being wholly located below the level of the seat and at least partly beneath the seat itself.

Preferably means of propulsion are provided comprising a lever system for each main wheel, the system being pivoted below the top of the wheel and having at least one pawl for engagement for example with the wheel rim so that pivoting of the pawl into engagement with the tyre followed by a pivotal movement of the system as a whole drives the wheel in the direction of pivoting of the system.

Conveniently each lever system comprises a main lever pivoted upon the wheel axis and carrying above the wheel and adjacent the wheel rim, a spindle to which an auxiliary driving lever is connected for pivotal movement about the spindle and with a pawl, the auxiliary driving lever being adapted for displacement between an operative position projecting above the seat and an inoperative position disposed substantially wholly below the seat so as to afford no impediment to the occupant sliding laterally on or off the seat.

The chair may be provided with a footrest which is movable substantially wholly below the seat so as to offer no impediment to the occupant resting a foot or both feet on the ground prior to mounting or dismounting, and conveniently a brake is provided carried about the axis of the adjustment mechanism for the footrest, the brake being adapted to hold the wheels locked on during mounting and dismounting.

Figure 1:
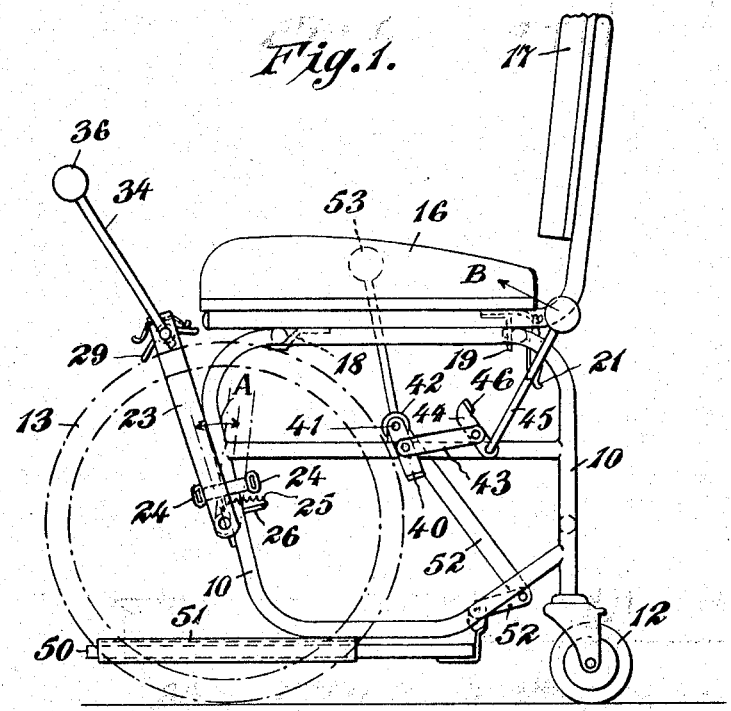
Figure 2:
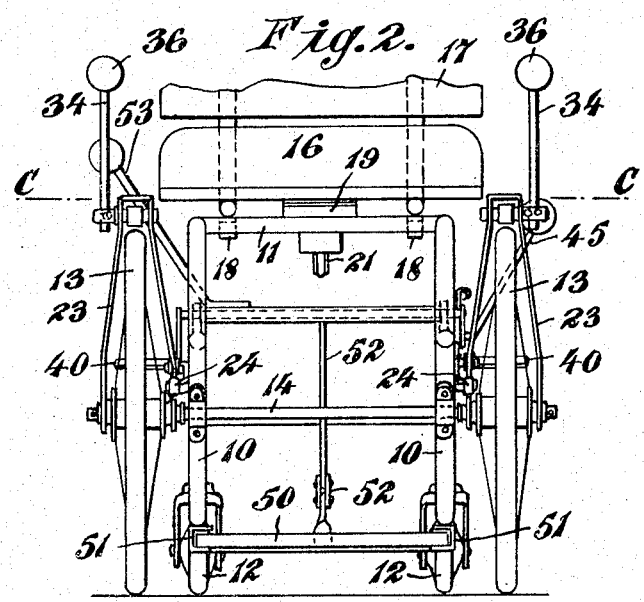

One preferred embodiment of the present invention is now more particularly described with reference to the accompanying drawings, wherein:

FIGURE 1 is an elevation of an invalid chair;
FIGURE 2 is a fragmentary front elevation of the chair;
FIGURE 3 is an enlarged fragmentary perspective view showing the propulsion mechanism;
FIGURE 4 is a fragmentary sectional elevation of the mechanism shown in FIGURE 3;
FIGURE 5 is an underneath perspective view of the seat proper removed from the chair; and
FIGURE 6 is a fragmentary perspective view from above showing a portion of the main frame of the chair.

Referring now to the drawings the chair comprises a main frame consisting of a pair of tubular looped members 10 located side by side and bridged by a number of transverse tubular members 11. The frame is provided with a pair of auxiliary castor wheels 12 adapted for free pivoting about the axes of the tubular members to which they are secured. These are provided at the rear of the chair.

At the front the chair is provided with a pair of main wheels 13 which are of considerably larger diameter than the auxiliary wheels. The main wheels are mounted on an axle 14 which extends across the width of the chair.

A seat, more particularly shown in FIGURE 5, comprises a U-shaped tubular sub-frame 15 to which is secured a seat squab 16 and a backrest 17. The sub-frame has a pair of joggled hook members 18 facing forwardly and between the arms of the sub-frame a bracket 19 is secured to the seat squab. As shown in FIGURES 1 and 6 the brackets 18 hook beneath one of the transverse members 11 and the bracket 19 engages between another of the said members 11 and a plate 20 secured thereto, a toggle catch 21 mounted on the member 11 making engagement with a lug 22 on the bracket 19 to secure the seat to the chair frame. This arrangement enables the seat proper to be removed and inverted so that the chair occupies less volume during transport and storage, and may possibly enable the chair to be carried in a car boot for easy transport from place to place.

The chair is provided with two sets of propulsion mechanisms, see more particularly FIGURES 3 and 4, one set for each main wheel 13. Each mechanism includes an inverted U-shaped main lever 23 which is pivotally mounted on the axle 14 and is limited in pivotal movement by a pair of padded lugs 24 carried by the main frame 10. A tension spring 25 is secured to a lug 26 also carried by the main frame and the other end of this spring is anchored to the main lever thereby resiliently urging the main lever to a rearward position.

In the limbs of the U-shaped main lever 23 adjacent the bridge of the U is secured a pair of co-axial sleeves 27 which journal a spindle 28 which is rotatable in the sleeves but is prevented from moving axially. Fixed on the spindle between the sleeves is a shallow angle V-shaped pawl 29 (see particularly FIGURE 3) and in the bridge and transversely of the U is located a resilient blade spring 30 which normally urges the pawl to a position symmetrically disposed relative to the main lever so that the pawl is free of contact with the rim of the tyre of the main wheel 13. The spindle is bored axially to accommodate a spring 31 which urges a ball 32 into the groove 33 about one end of an auxiliary driving lever 34 which passes through aligned transverse bores in the spindle and has a cotter pin 35 at one end. At the opposite end of the lever 34 to the cotter pin is a knob 36. The ball and spring cooperate with the groove to normally hold the lever 34 in the position shown in FIGURES 1 to 4 in full lines, but permit the lever to be displaced to the position shown in FIGURE 3 in dotted lines in which the knob closely abuts the spindle.

It will be seen by reference to FIGURES 1 and 3 that the auxiliary levers 34 normally project above the level of the seat squab but when in the said dotted line position are located substantially below at least the top surface of the said seat squab.

The propulsion system operates as follows:
The auxiliary levers are extended to the normal i.e. full line position and the occupant of the chair holds both knobs 36. Assuming that the chair is to be driven forwardly in a straight line both auxiliary levers are pivoted forwardly about the axis of spindles 28 and this pivots the pawls 29 with the spindles 28 to take one end of each into frictional engagement with the tyre of the corresponding main wheel. Continued movement of the knobs 36 in the said direction pivots the main levers 23 forwardly until the stops 24 are contacted whereupon the lever systems are swung rearwardly either manually or by the springs 25, this operation together with the operation of the springs 30 taking the pawls out of engagement with the tyres. The operation is repeated as often as necessary and upon each forward movement the wheel may be moved through the angle A (FIGURE 1) that is the angle subtended by main levers 23 between the stops 24.

If the chair is to be moved rearwardly substantially the opposite operation is carried out; that is firstly the main levers 23 are moved forwardly but without contacting the pawls with the tyres, and then the auxiliary driving levers 34 are pivoted about the spindle axes to contact the rear tip of each pawl with the tyre, and then the complete lever systems are swung rearwardly.

It will be appreciated that by making different movements with the two lever systems the chair as a whole may be rotated about a central vertical axis, or alternatively turned through comparatively narrow angles. Again one lever system may be held stationary with the pawl engaged with the tyre whilst the other lever system is used, in which case the chair will turn about an axis passing through the wheel which is held sationary.

The chair is provided with a brake for locking both main wheels and comprising a braking lever 40 associated with each wheel and fast with a transverse shaft 41 which extends across the chair and is journalled in eyes 42 mounted on the main frame. Each braking lever is pivoted between its ends to one end of an associated link 43 and the other end of the link is pivoted between the ends of a corresponding locking lever 44. One end of each locking lever is fast with an operating handle 45 journalled in the frame about an axis passing through that end, and the other end of the locking lever is bent transversely at 46. The locking lever is located at one side of the chair near the rear convenient for use by the occupant.

In operation the operating handle 45 is swung in the direction of an arrow B (FIGURE 1) to operate the toggle joints provided by links 43 and levers 44, this movement being terminated when the said ends 46 abut the links 43. During movement the operative end of each brake lever 40 is urged into contact with the corresponding tyre.

The chair is provided with a footrest 50 capable of fore and aft sliding movement in channels 51 mounted on the main frame, and the footrest is linked by a system of levers 52 to an operating handle 53, this handle being journalled on the transverse shaft 41 of the brake system.

It will be appreciated that the footrest may be retracted to the position shown in FIGURE 1 in which it lies substantially wholly beneath the seat, so as to offer little impediment to the occupant placing a foot or both feet on the floor in front of the chair prior to mounting or dismounting, and after mounting may be advanced by movement of the handle to a suitable position for the occupant's feet providing a degree of comfort for the user.

It will be noted that the main wheels are located wholly below the line C—C FIGURE 2 which indicates the plane of the base of the seat and are located partly beneath the seat as viewed in front elevation (FIGURE 2).

By these means the chair is rendered relatively narrow and compact; for example a chair with a seat 16" wide may have an overall maximum width of 21" enabling it to be manoeuvred with ease within the confines of a normal dwelling house.

In a modification, not shown, the seat is mounted on a sub-frame which is movable relative to the main frame when in use, i.e. when an occupant is seated, for example so as to enable the height of the seat above the wheel to be varied. This may be done for example via a screw-jack operated by a manually powered pump. This may enable an invalid housewife to elevate herself on the chair to reach a high shelf etc.

I claim:
1. An invalid wheel chair comprising a frame carrying a seat for the occupant, a pair of main wheels and at least one auxiliary wheel, all located wholly below the level of the seat and supporting the frame for wheeled movement, and a separate propulsion system for each main wheel, including a main lever pivoted on an axis that substantially coincides with the axis of the wheel, a pawl which is pivoted adjacent to the free end of the main lever, on an axis parallel to the axis of the wheel, and which has two edges, located on opposite sides of the pawl axis, that are engageable with the periphery of the wheel to drive the wheel in two opposite directions, a spring which urges the pawl to a neutral position out of engagement with the wheel, and an auxiliary lever for rocking the pawl, which is slidably connected to the pawl for movement between a position in which it extends above the level of the seat and a position in which it is wholly below the level of the seat.

2. An invalid wheel chair according to claim 1 comprising a footrest slidably mounted between the main wheels for movement between an extended position in front of the chair and a retracted position below the seat, and mechanism for moving the footrest including an operating handle which in all of its positions is below the level of the seat.

3. An invalid wheel chair according to claim 1 comprising a brake pivoted to the frame for movement into and out of engagement with a main wheel, and mechanism for moving the brake including an operating handle which in all of its positions is below the level of the seat.

References Cited by the Examiner

UNITED STATES PATENTS

| 521,463 | 6/1894 | Smith-Fraser | 280—242 |
|---|---|---|---|
| 565,696 | 8/1896 | Smith | 74—157 |
| 1,633,363 | 6/1927 | Carlson | 188—2 |
| 2,130,426 | 9/1938 | Henderson | 280—244 |
| 2,762,422 | 9/1956 | Stratton. | |
| 2,847,058 | 8/1958 | Lee | 280—249 X |
| 3,123,397 | 3/1964 | Murcott. | |
| 3,189,368 | 6/1965 | Petersen | 280—242 |
| 3,223,431 | 12/1965 | Gootfried et al. | |

KENNETH H. BETTS, *Primary Examiner.*